United States Patent [19]

Shigeno et al.

[11] Patent Number: 5,180,903
[45] Date of Patent: Jan. 19, 1993

[54] MAGNETIC DETECTING UNIT HAVING ALIGNED SENSORS

[75] Inventors: Yoshiharu Shigeno, Yokohama; Michihiro Murata, Ohharanonishi; Yu Nishino, Ebina, all of Japan

[73] Assignee: Murata Mfg. Co., Ltd., Kyoto, Japan

[21] Appl. No.: 497,060

[22] Filed: Mar. 21, 1990

[30] Foreign Application Priority Data

Mar. 24, 1989 [JP] Japan .................. 1-33567[U]

[51] Int. Cl.⁵ .............. G06K 7/08; G11B 5/265; G11B 5/29; G11B 5/10
[52] U.S. Cl. .................. 235/449; 360/121; 360/129
[58] Field of Search ............. 235/449, 450; 360/121, 360/129, 113

[56] References Cited

U.S. PATENT DOCUMENTS

| | | | |
|---|---|---|---|
| 3,806,902 | 4/1974 | Drees et al. | 360/129 |
| 4,117,523 | 9/1978 | Masuda et al. | 360/129 |
| 4,439,671 | 3/1984 | Helle | 235/449 |
| 4,574,190 | 3/1986 | Nishimura | 235/449 |
| 4,642,716 | 2/1987 | Wakabayashi et al. | 360/113 |
| 4,841,399 | 6/1989 | Kitada et al. | 360/113 |
| 4,896,235 | 1/1990 | Takino et al. | 360/113 |
| 4,926,278 | 5/1990 | Schoenmakers | 360/129 |
| 4,988,850 | 1/1991 | Masuda et al. | 235/449 |

FOREIGN PATENT DOCUMENTS

| | | |
|---|---|---|
| 0008998 | 3/1980 | European Pat. Off. |
| 58-106658 | 6/1983 | Japan |
| 2100910 | 1/1983 | United Kingdom |
| 2114795 | 8/1983 | United Kingdom |

OTHER PUBLICATIONS

JP-A-58 106658 (Denki Onkiyou K.K.) 25 Jun. 1983 in: Patent Abstracts of Japan; vol. 7, No. 212 (P-224)(1357) 20 Sep. 1983.

*Primary Examiner*—Eugene R. LaRoche
*Assistant Examiner*—Christopher R. Glembocki
*Attorney, Agent, or Firm*—Townsend and Townsend

[57] ABSTRACT

A magnetic sensor unit includes an elongated nonmagnetic sensor case, magnets, magnetic sensors, and positioning portions. The sensor case has a plurality of sensor housing recesses formed in a row in its upper surface in its longitudinal direction, and magnet housing recesses formed in a row in its lower surface at positions respectively corresponding to the sensor housing recesses. At least the upper surface of the sensor case is covered with a nonmagnetic cover. The magnets are respectively housed in the magnet housing recesses of the sensor case. The magnetic sensors are respectively housed in the sensor housing recesses of the sensor case and have magnetoelectric transducers magnetically biased by the magnets. The positioning portions are respectively formed in the sensor housing recesses of the sensor case and respectively position the magnetic sensors in a longitudinal direction thereof and a direction perpendicular thereto.

9 Claims, 10 Drawing Sheets

MAGNETIC DETECTING UNIT HAVING ALIGNED SENSORS

BACKGROUND OF THE INVENTION

1. Field of the Invention

The present invention relates to a magnetic sensor unit for use in for example a banknote identifying apparatus for identifying, the denomination of a banknote by using magnetically biased magnetoelectric transducers.

2. Description of the Prior Art

A magnetic sensor using magnetoelectric transducers has been used to read characters and symbols which are printed on banknotes and bonds with magnetic inks and the like. Since magnetoelectric transducers have low impedances, no inductance component, and high sensitivity, they have been used in place of conventional magnetic heads.

Figure 1:
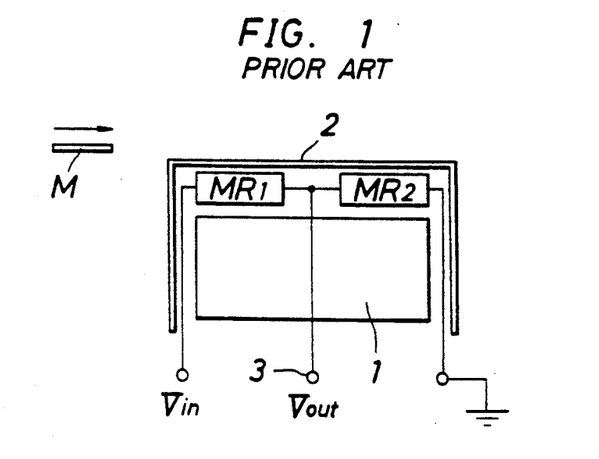
FIG. 1 is a view showing a circuit arrangement of a magnetic sensor.

FIG. 1 shows a circuit arrangement of a magnetic sensor of this type. Reference numeral 1 denotes a permanent magnet. Reference symbols MR1 and MR2 denote two series-connected magnetoelectric transducers which are magnetically biased by the permanent magnet 1. A voltage Vin is applied to one end of the pair of magnetoelectric transducers MR1 and MR2, and the other end of the pair is grounded. The upper portions of the two magnetoelectric transducers MR1 and MR2 are covered with a metal cover 2 with a small gap.

Figure 2:
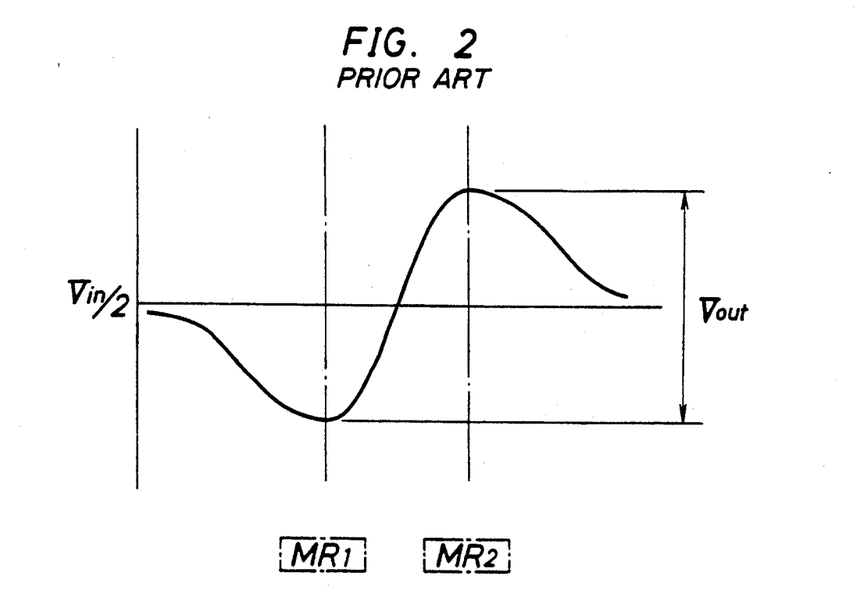
FIG. 2 is a graph showing an output voltage waveform from the magnetic sensor unit.

Assume that a very small magnetic element M comes from the left of the metal cover 2 and moves over the metal cover 2 in a direction indicated by an arrow, approaches the magnetoelectric transducers MR1 and MR2 in this order, and moves to the right. In this case, since the strengths of magnetic fields acting on the respective magnetoelectric transducers are changed, an output voltage Vout, which is changed as shown in FIG. 2, is generated from an output terminal 3 connected to the node between the magnetoelectric transducers MR1 and MR2. The presence of the magnetic element M can be detected by measuring this voltage change.

Figure 3:
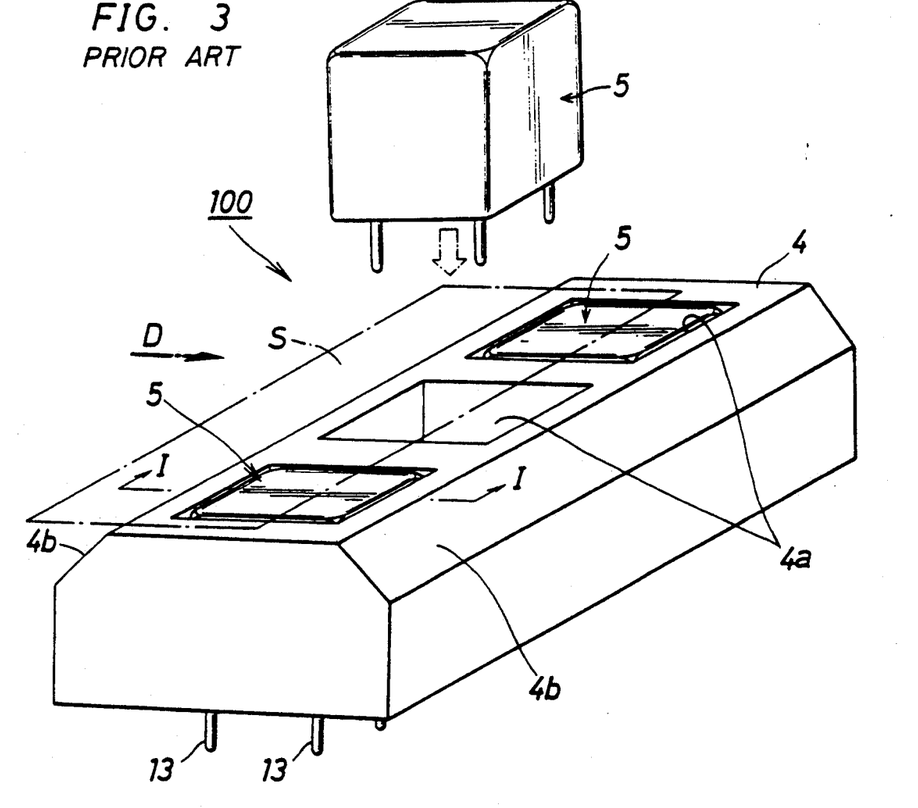
FIG. 3 is a perspective view showing a conventional magnetic sensor unit.

For example, a magnetic sensor unit disclosed in Japanese Laid-Open Utility Model No. 61-49466 is known as a magnetic sensor unit utilizing such a principle. FIG. 3 shows such a magnetic sensor unit.

A magnetic sensor unit 100 comprises a rectangularly parallelepiped sensor case 4 made of a nonmagnetic material such as a plastic or aluminum material, and detecting units 5 which are respectively housed in a plurality (three in FIG. 3) of unit fitting holes 4a formed in the sensor case 4 in its longitudinal direction. Both the longitudinal side portions of the upper surface of the sensor case 4 constitute inclined surfaces 4b on which the end faces of a banknote guide plate (not shown) are positioned. A banknote S (indicated by an alternate long and short dashed line) is guided by the banknote guide plate and passed over the upper surface side of the sensor case 4 in a direction indicated by an arrow D.

Figure 4:
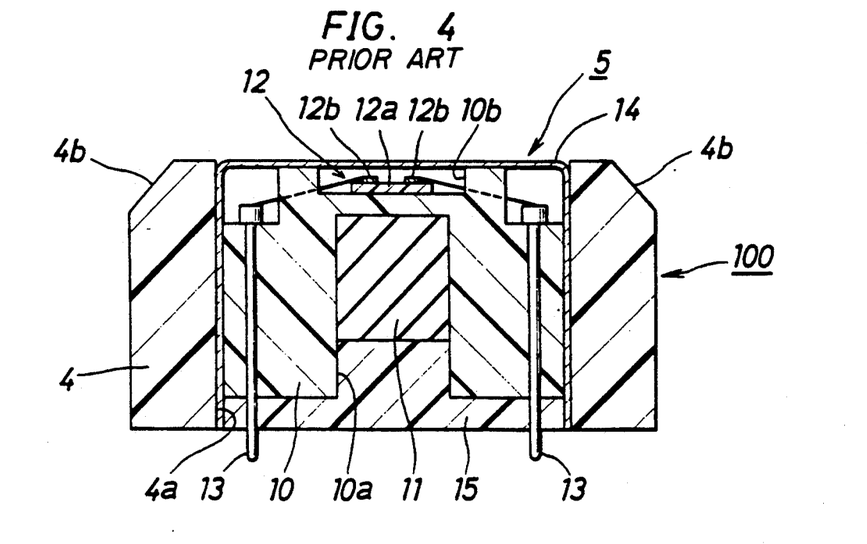
FIG. 4 is a sectional view taken along a line I—I in FIG. 3.
Figure 5:
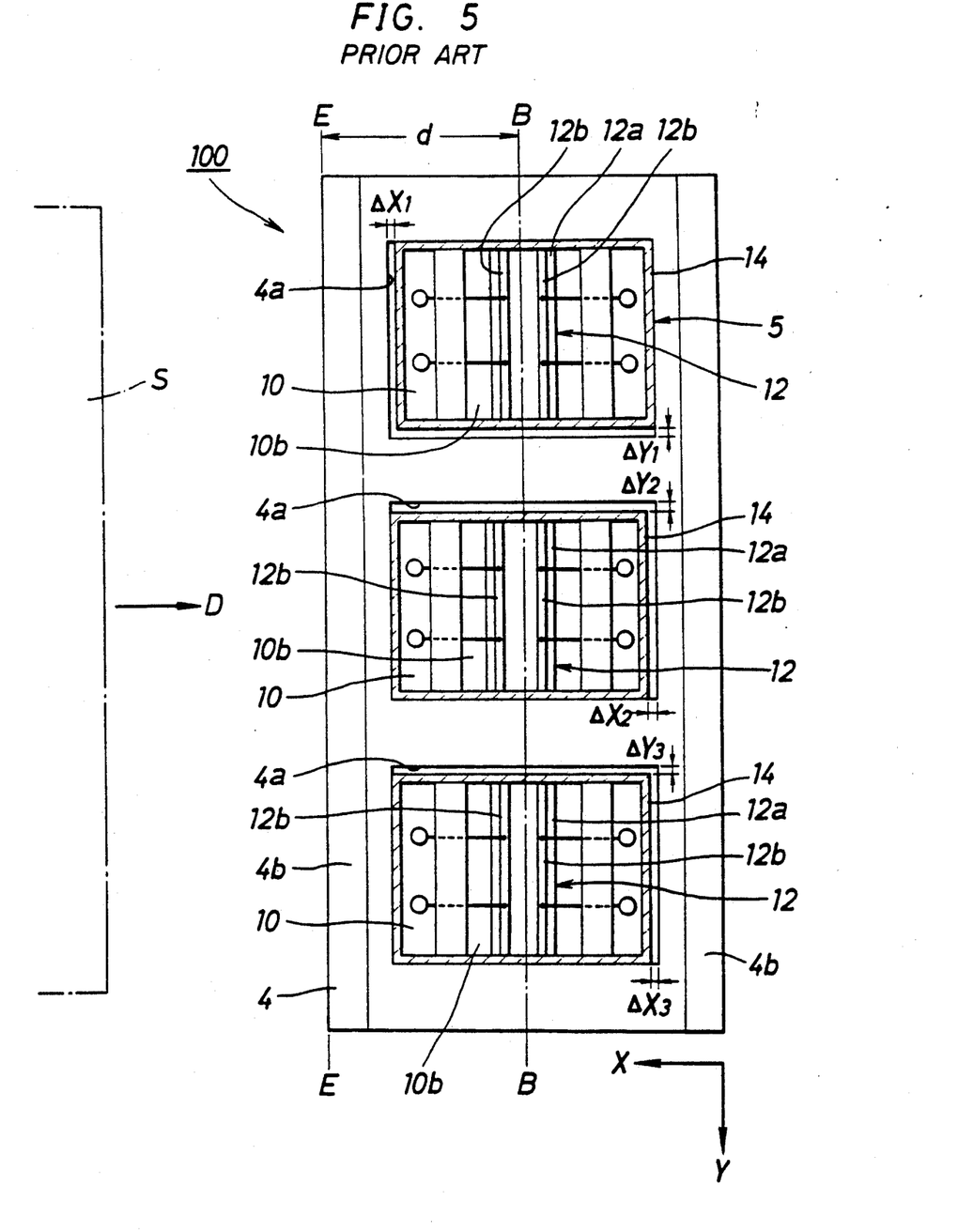
FIG. 5 is a plan view, showing the conventional magnetic sensor unit in FIG. 3, for explaining a problem in assembly.

As is apparent from FIGS. 4 and 5, each detecting unit 5 comprises: a stem 10 made of a nonmagnetic material such as a plastic material; a magnet 11 which has upper and lower surfaces respectively magnetized to the S and N poles and is housed in a magnet housing recess 10a which is formed in the stem 10 so as to extend from its bottom surface to its upper surface side and to have a substantially rectangular or circular section; a magnetic sensor 12 which is housed in a sensor housing recess 10b, which is formed in the banknote passage surface side (upper surface side) of the stem 10 so as to have a substantially rectangular section, and is magnetically biased by the magnet 11; a plurality of terminal pins 13 for connecting the magnetic sensor 12 to an external part; and an outer cover 14 made of wear resistant non-magnetic metal such as tungsten and phosphor bronze which is fitted on the unit from the upper side of the stem 10 and covers the upper surface and side surfaces of the stem 10 while the magnetic sensor 12 is mounted in the unit. A molding material 15 is charged into the unit from the lower surface side of the outer cover 14 in order to fix the stem 10 in the outer cover 14. The magnetic sensor 12 comprises a ceramic substrate 12a housed in the sensor housing recess 10b, and a pair of magnetoresistive elements 12b fixed on the substrate 12a and magnetically biased by the magnet 11. The magnetoresistive elements 12b are connected to the terminal pins 13, respectively.

When the detecting unit 5 is to be housed in the unit fitting hole 4a of the sensor case 4, the magnetoresistive elements 12b are regularly arranged at predetermined positions in the X direction perpendicular to a detection line B—B and the Y direction parallel thereto.

In the magnetic sensor unit 100 assembled in this manner, when a banknote comes from a direction indicated by an arrow D in FIG. 5, the magnetic sensors 12 of all the detecting units 5 detect the magnetic ink of the banknote and output detection signals.

In such a conventional magnetic sensor unit, however, when the sensor unit 4 is molded, manufacturing dimensional errors of the unit fitting holes 4a are caused upon molding, and the stem 10 and the outer cover 14 exhibit variations in dimension for each detecting unit 5. Therefore, when the detecting units 5 are respectively fitted in the unit fitting holes 4a of the sensor case 4, gaps X1, X2, and X3 appear in the X direction perpendicular to the detection line B - B, and at the same time, gaps Y1, Y2, and Y3 appear in the Y direction parallel to the detection line B—B, as shown in FIG. 5. As a result, the magnetic sensor 12 of each detecting unit 5 may be deviated from the detection line B—B. The phenomenon that the magnetic sensor 12 of each detecting unit 5 is deviated from the detection line B—B also occurs when manufacturing errors are caused in terms of, e.g., the dimension of each stem 10 and the thickness of each outer cover 14.

Assume that a reference detection plane E—E of the sensor case 4 is set when a banknote S comes from the direction indicated by the arrow D in FIG. 5. In this case, a distance d between the reference detection surface E—E and the detection line B—B varies within the ranges of the gaps ΔX1, ΔX2, and ΔX3. In addition, positional errors of the magnetic sensors 12 are caused within the ranges of ΔY1, ΔY2, and ΔY3, respectively, in the Y direction along the detection line B—B. As a result, the detection line B—B varies for each detecting unit 5. Hence, accurate detection cannot be performed, and the insertion of the banknote must be repeated. That is, in the conventional technique, in order to perform accurate positioning of each magnetic sensor 12 without a positional error with respect to the detection line B—B, the following procedure is required. The dimensions of the unit fitting holes 4a of the sensor case 4 are matched with each other. The dimensions of the stems 10 of the respective detection units 5 are accurately matched with each other, and so are the thicknesses of the respective outer covers 14. In addition, each magnetic sensor 12 must be accurately positioned to a corresponding stem 10 to be mounted. In order to mount the magnetic sensors 12 of all the detecting units 5 without positional errors with respect to the detection line B—B, high-precision processing and mounting techniques are required.

SUMMARY OF THE INVENTION

It is an object of the present invention to provide a magnetic sensor unit in which each magnetoelectric transducer is easily aligned with a detection line so as to ensure an accurate detecting operation.

In order to achieve the above object, according to the present invention, there is provided a magnetic sensor unit comprising a sensor case having magnet housing recesses formed in a row in a bottom portion thereof and having a plurality of sensor housing recesses formed in a row in a surface thereof which an object to be detected passes, the plurality of sensor cases being covered with a nonmagnetic cover, a plurality of magnets respectively housed in the magnet housing recesses of the sensor case, a plurality of magnetic sensors respectively housed in the sensor housing recesses of the sensor case and having magnetoresistive elements mounted on a substrate and magnetically biased by the magnets, and positioning portions, respectively formed in the sensor housing recesses, for positioning and aligning the magnetic sensors with a detection line.

With this arrangement, all the magnetic sensors are positioned in a specific direction by the positioning portions in the sensor housing recesses of the sensor case and are housed in the sensor housing recesses so as to be aligned with the detection line. When the magnets are respectively housed in the magnet housing recesses, magnetic biases are respectively applied to the magnetic sensors.

Subsequently, by fitting the cover on the surface side of the sensor case over which an object to be examined passes, the sensor housing recesses are sealed. With this process, the magnetic sensor unit is formed.

Since each magnetic sensor is positioned on the detection line by a corresponding positioning portion, each magnetic sensor outputs an accurate detection signal.

BRIEF DESCRIPTION OF THE DRAWINGS

FIGS. 6 to 10 show a magnetic sensor unit according to the first embodiment of the present invention, in which

FIGS. 11 to 14 show a magnetic sensor unit according to the second embodiment of the present invention, in FIG. 11 is a sectional view equivalent to FIG. 7.

FIGS. 16 to 19 show a magnetic sensor unit according to the fourth embodiment of the present invention, in which

DETAILED DESCRIPTION OF THE PREFERRED EMBODIMENTS

The present invention will be described below with reference to the accompanying drawings.

FIGS. 6 to 10 show a magnetic sensor unit according to the first embodiment of the present invention. The same reference numerals in FIGS. 6 to 10 denote the same parts as in FIGS. 3 to 5.

Figure 6:
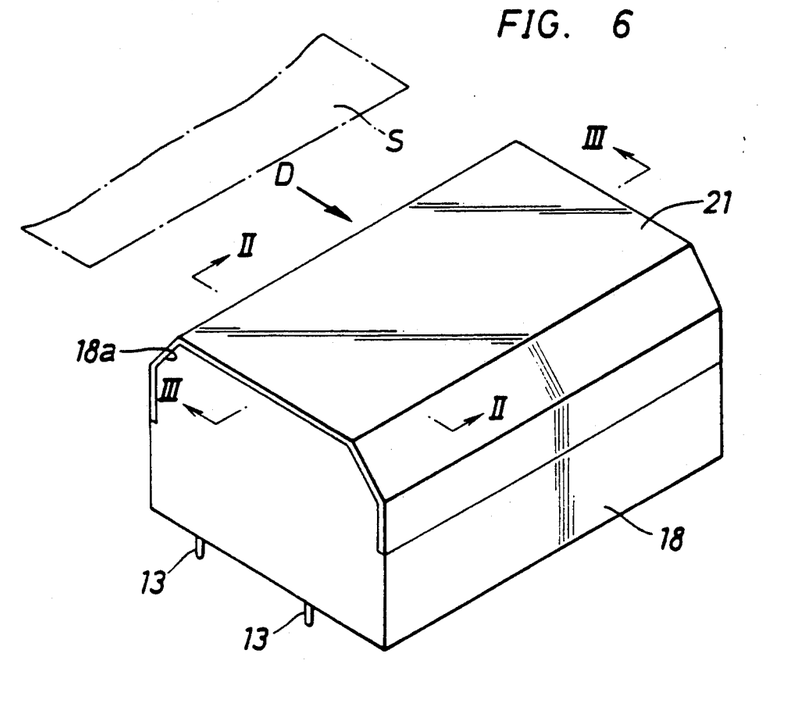
FIG. 6 is a perspective view of the magnetic sensor unit.
Figure 7:
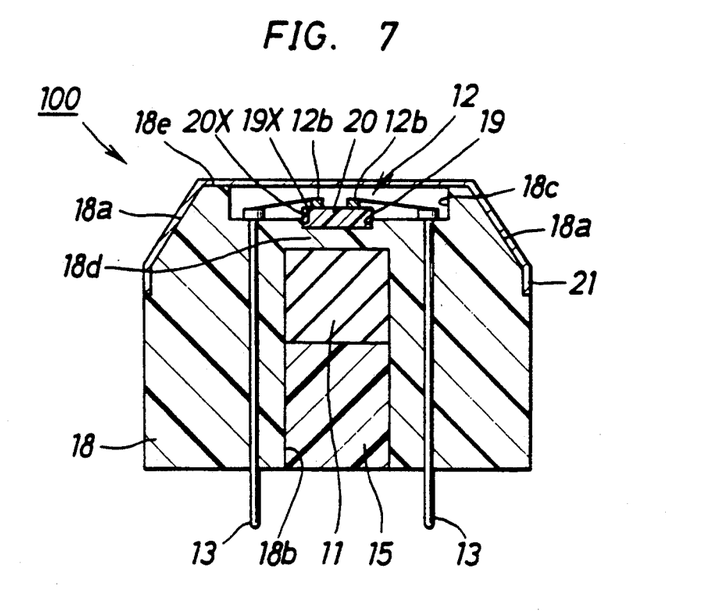
FIG. 7 is a sectional view taken along a line II—II in FIG. 6.
Figure 8:
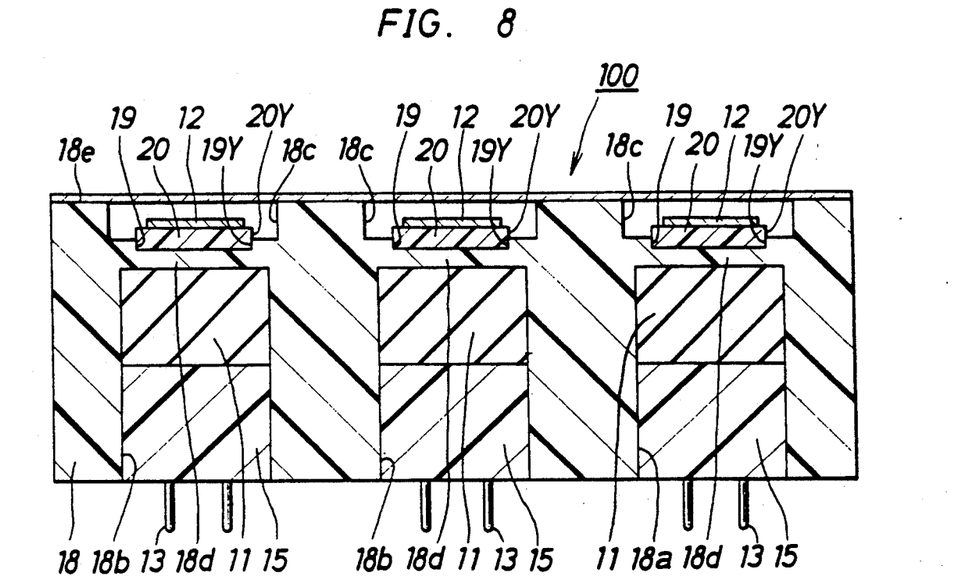
FIG. 8 is a longitudinal sectional view taken along a line III—III in FIG. 6.

Referring to FIGS. 6–8, reference numeral 18 denotes a rectangularly parallelepiped sensor case made of a nonmagnetic material such as a plastic or aluminum material. As will be described later, a banknote S is to pass over the upper surface of the sensor case 18. Both longitudinal side portions of the upper surface of the sensor case 18 constitute inclined surfaces 18a on which the end faces of a banknote guide plate (not shown) are located. Three magnet housing recesses 18b, each having a substantially rectangular section, are formed in the sensor case 18 along its longitudinal direction at equal intervals so as to extend from the bottom surface side to the upper surface side of the sensor case 18. In addition, elongated rectangular sensor housing recesses 18c are respectively formed in the banknote passage surface side (upper surface side) of the sensor case 18, immediately above the magnet housing recesses 18b, in a direction (X direction) perpendicular to a detection line B—B (FIG. (9). A bias adjusting portion 18d for adjusting a magnetic bias from each magnet 11 with respect to a corresponding magnetic sensor 12 (to be described later) is formed between each sensor housing recess 18c and a corresponding magnet housing recess 18b. Each sensor housing recess 18c is surrounded by a cover support portion 18e.

The magnets 11 are respectively housed in the magnet housing recesses 18b. The upper and lower surfaces of each magnet 11 are respectively magnetized to the S and N poles.

Figure 9:
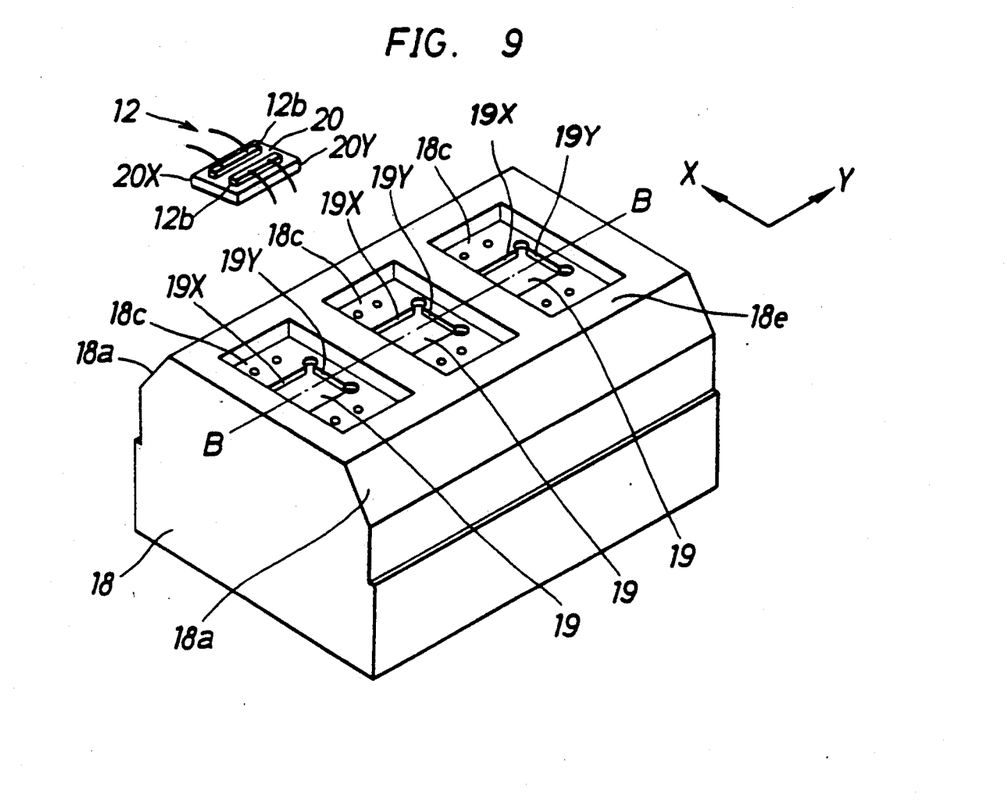
FIG. 9 is a perspective view showing the magnetic sensor unit from which a head cover is detached.

Reference numeral 19 denotes a positioning recess as a positioning portion, formed in the bottom portion of each sensor housing recess 18c, for positioning a corresponding magnetic sensor 12 (to be described later). Each positioning recess 19 is formed to be a shallow rectangular recess. The positioning recess 19 has at least two reference surfaces 19X and 19Y perpendicular to each other. The first reference surface 19X is formed to be parallel to the detection line B—B, and the second reference surface 19Y is formed to be perpendicular to the detection line B—B and be divided into two equal parts by the detection line B—B.

Figure 10:
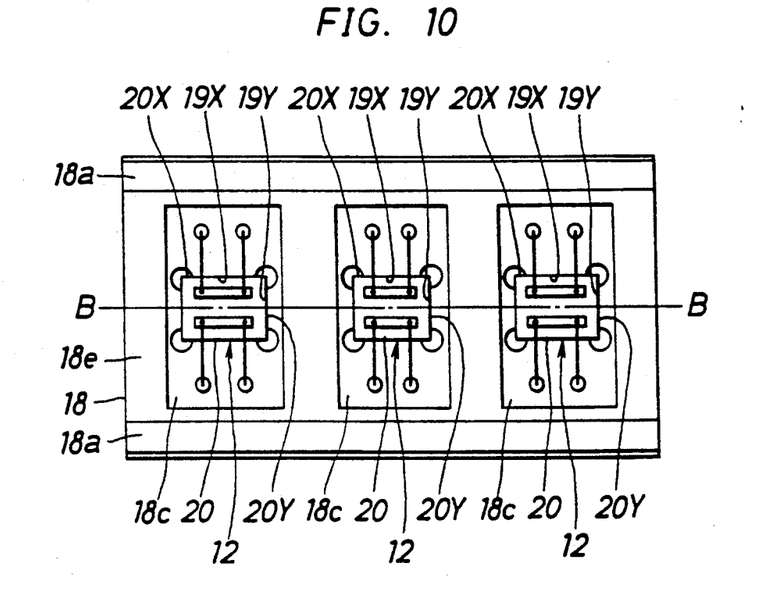
FIG. 10 is a plan view showing the magnetic sensor unit on which magnetic heads are mounted.
Figure 11:
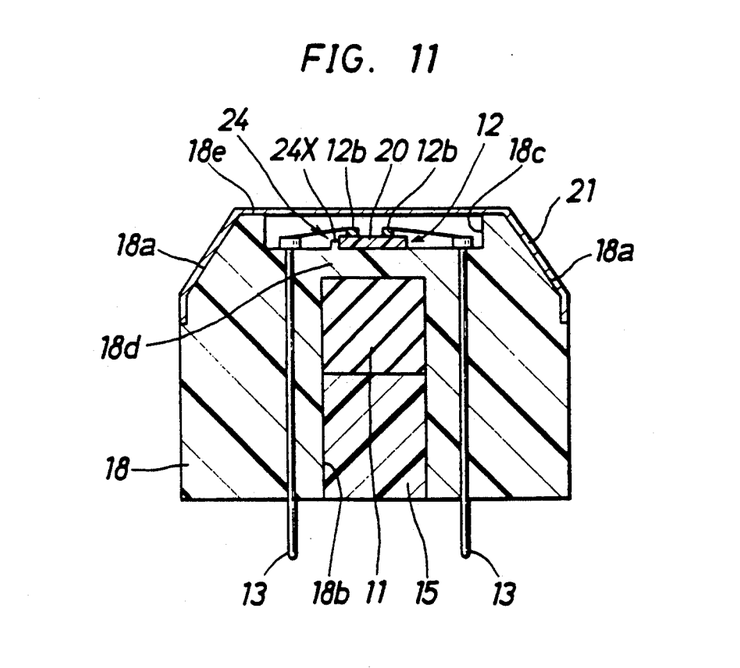
Figure 12:
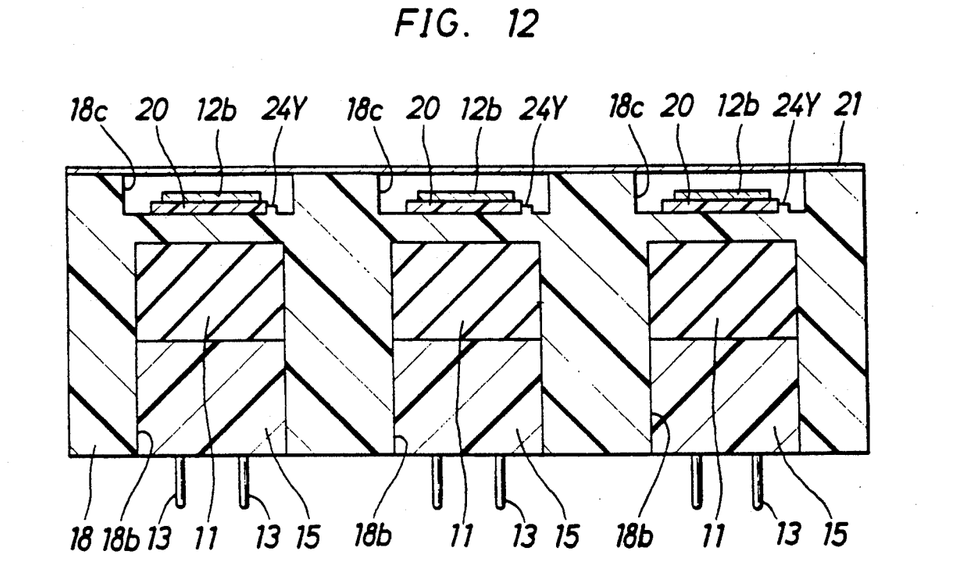
FIG. 12 is a longitudinal sectional view equivalent to FIG. 8.

The magnetic sensors 12 are respectively housed in the sensor housing recesses 18c so as to be positioned in the positioning recesses 19. Each magnetic sensor 12 comprises a rectangularly parallelepiped substrate 20 having first and second reference end faces 20X and 20Y perpendicular to each other, and a pair of magnetoresistive elements 12b mounted on the substrate 20. The magnetic sensors 12 are magnetically biased by the magnets 11, respectively. The lengths of the first and second reference end faces 20X and 20Y of each substrate 20 are substantially equal to or slightly smaller than those of the first and second reference surfaces 19X and 19Y of each positioning recess 19, respectively. The thickness of the substrate 20 is larger than the depth of the positioning recess 19. In addition, the strength of a magnetic bias from each magnet 11 which acts on a corresponding magnetoresistive element 12b is adjusted in accordance with the thickness of a corresponding bias adjusting portion 18d. The strength of a magnetic bias is reduced with an increase in thickness of the portion 18d. Reference numeral 13 denotes a terminal pin for connecting each magnetoresistive element 12b to an external part.

Reference numeral 21 denotes a head cover fitted on the upper surface of the sensor case 18 so as to cover the magnetoresistive elements 12b. The head cover 21 is made of a nonmagnetic metal such as tungsten, phosphor bronze, titanium, or an alloy thereof in order to have nonmagnetic properties and abrasion resistance, thus smoothly guiding banknotes. Reference numeral 15 denotes a resin molding material.

When the magnetic sensor unit having the above-described arrangement is to be assembled, the magnetic sensors 12 are assembled in an independent stem in the first place by respectively mounting the magnetoresistive elements 12b on the substrates 20.

The magnetic sensors 12 are then respectively housed in the positioning recesses 19. In this case, an adhesive is coated on the bottom surface of each positioning recess 19, and the first and second reference end faces 20X and 20Y of each substrate 20 are respectively shifted to the first and second reference surfaces 19X and 19Y of each substrate 10 and brought into contact therewith in order that each magnetic sensor 12 on the bottom surface of a corresponding sensor housing recess 18c is positioned and fixed. With this process, each magnetic sensor 12 is positioned in the X direction perpendicular to the detection line B—B and in the Y direction parallel thereto.

Subsequently, the magnetoresistive elements 12b are respectively connected to the terminal pins 13, and the magnets 11 are respectively housed in the magnet housing recesses 18b.

The head cover 21 is then fitted on the sensor case 18 from its upper surface side, and is fixed thereto by an adhesive. Since the head cover 21 is supported by the cover support portions 18e of the sensor case 18, downward bending of the cover 21 is prevented, and contact thereof with the magnetoresistive elements 12b is prevented. The resin molding material 15 is charged into each magnet housing recess 18b from the lower surface side of the sensor case 18 so as to fix each magnet 11. With this process, the magnetic sensor 100 is assembled.

The magnetic sensor unit of this embodiment has the above-described arrangement. An operation of the magnetic sensor unit will be described next.

When a banknote S as an object to be detected comes from a direction indicated by an arrow D in FIG. 6, the banknote S slides on the head cover 21. In this case, the magnetoresistive elements 12b of the magnetic sensors 12 detect a magnetic ink of the banknote S, and output detection signals, respectively.

Since each magnetic sensor 12 is positioned in the X direction perpendicular to the detection line B—B and in the Y direction parallel thereto, each magnetoresistive element 12b can output an accurate detection signal.

Since the head cover 21 is only fitted on the sensor case 18, the magnetic sensors 12 can be arranged at smaller intervals and fitted in the sensor case 18 more densely than the conventional technique.

In addition, since the substrate 20 of each magnetic sensor 12 is located only slightly inside the positioning portion 19, vibrations generated when a banknote advances are not transmitted to the magnetic sensor 12 through the head cover 21 and the sensor case 18.

FIGS. 11 to 14 show a magnetic sensor unit according to the second embodiment of the present invention.

The same reference numerals in the second embodiment denote the same parts as in the first embodiment.

Figure 13:
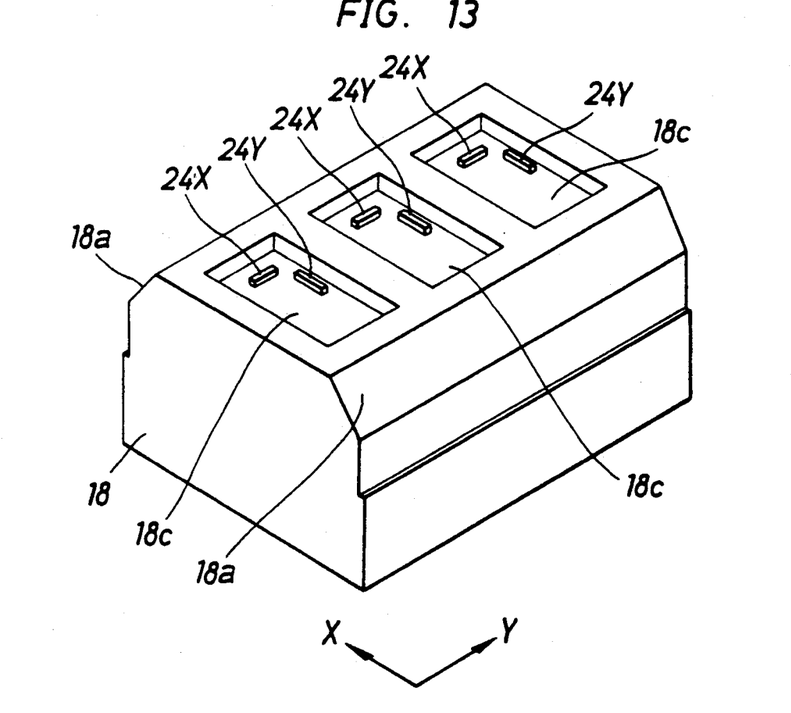
FIG. 13 is a perspective view showing the magnetic sensor unit from which a head cover is detached.
Figure 14:
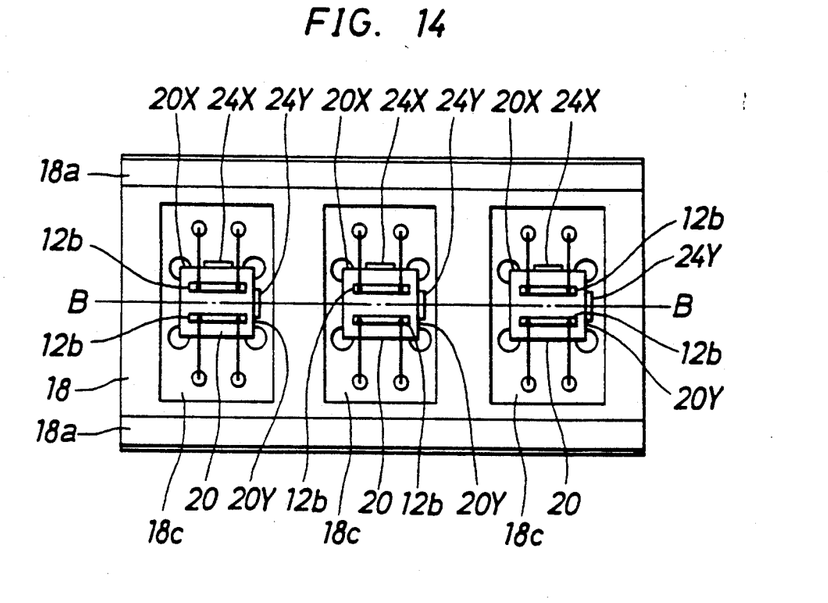
FIG. 14 is a plan view of the magnetic sensor unit on which magnetic heads are mounted, which is equivalent to FIG. 10.

Reference numeral 24 denotes a position projection as a positioning portion. Each positioning projection 24 consists of an X-direction positioning projection 24X and a Y-direction positioning projection 24Y. Each X-direction positioning projection 24X is formed upright to be parallel to a detection line B—B, and each Y-direction positioning projection 24Y is formed upright to be perpendicular to the detection line B—B.

As shown in FIG. 14, when each magnetic sensor 12 is housed in a corresponding sensor housing recess 18c, the X-direction positioning projection 24X is brought into contact with a first reference end face 20X of a substrate 20 so as to perform positioning of the magnetic sensor 12 in the X direction. Each positioning projection 24X is formed at a position where the center line of a corresponding magnetic sensor 12 is aligned with the detection line B—B when the magnetic sensor 12 is housed in the sensor housing recess 18c. Each Y-direction positioning projection 24Y is brought into contact with a second reference end face 20Y of a corresponding substrate 20 constituting the magnetic sensor 12 so as to perform positioning of the magnetic sensor 12 in the Y direction. By adjusting the formation position of each positioning projection 24Y in the Y direction along the detection line B—B, positioning of a corresponding sensor 12 is performed in the Y direction.

Even with the above-described arrangement of the magnetic sensor unit of the second embodiment, accurate positioning of each magnetic sensor 12 can be performed in the same manner as in the first embodiment, and hence the same effects as those of the first embodiment can be obtained.

Two or three pins or projections may be arranged at intervals in place of each positioning projection.

Figure 15:
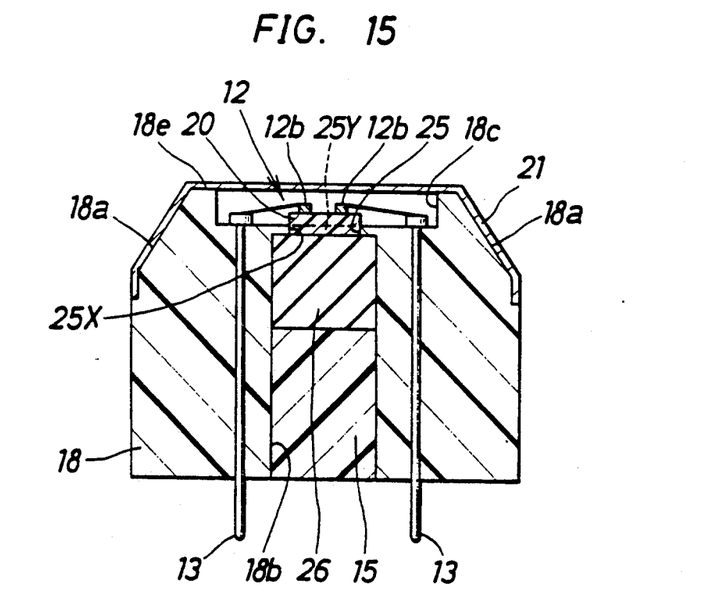
FIG. 15 is a sectional view of a magnetic sensor unit according to the third embodiment of the present invention, which is equivalent to FIG. 7.

FIG. 15 shows a magnetic sensor unit according to the third embodiment of the present invention. The same reference numerals as in the above-described embodiments denote the same parts in the third embodiment. This embodiment is different from the above embodiments in that a sensor case 18 comprises no portions corresponding to the bias adjusting portions 18d.

Reference numeral 25 denotes a positioning hole as a positioning portion. Each positioning hole 25 is formed as a rectangular through hole extending through each magnet housing recess 18b from the bottom surface of each sensor housing recess 18c. As shown in FIG. 15, magnetic sensors 12 are respectively housed in the positioning holes 25 so as to be positioned. Each positioning hole 25 has at least two reference surfaces 25X and 25Y perpendicular to each other. The first reference surface 25X is formed to be parallel to a detection line B—B, and the second reference surface 25Y is formed to be perpendicular to the detection line B—B and divided into two equal parts thereby.

Reference numeral 26 denotes a magnet of this embodiment, which is arranged in each magnet housing recess 18b in place of the magnet 11 of the first embodiment. The magnetic force of the magnet 26 is smaller than that of the magnet 11 of the first embodiment.

The magnetic sensor unit of this embodiment has the above-described arrangement. An operation of the magnetic sensor unit will be described next.

With this arrangement, since no bias adjusting portions 18d are formed unlike the first embodiment, even if the magnets 26 having small magnetic forces are mounted, the same biases as those of the magnets of the first embodiment can be respectively applied to magnetoresistive elements 12b. Hence, similar to the first embodiment, accurate detection signals can be obtained.

FIGS. 16 to 19 show a magnetic sensor unit according to the fourth embodiment of the present invention. The same reference numerals in the fourth embodiment denote the same parts as in the above-described embodiments.

In a sensor case 18 of this embodiment, a pair of left and right cover support pieces 18f and 18g extend upward from the bottom surface of each sensor housing recess 18c so as to oppose each other in a direction perpendicular to a detection line B—B. The upper surface of each of the cover support pieces 18f and 18g is continuous with the upper surface of each cover support portion 18e. The inner end face of each of the cover support pieces 18f and 18g extends to a position where it is not in contact with a substrate 20 of a corresponding magnetic sensor 12.

The magnetic sensor unit of this embodiment has the above-described arrangement. Even with this arrangement, the fundamental operation of the magnetic sensor unit is the same as that of the first embodiment. However, in this embodiment, since the pair of cover support pieces 18f and 18g are arranged in the longitudinal direction of each sensor housing recess 18c, a head cover 21 is supported by each pair of cover support pieces 18f and 18g, and bending of the head cover 21 can be prevented. Therefore, contact of the head cover 21 with the magnetoresistive elements 12b is prevented, and the operation of each magnetoresistive element 12b is free from interference.

Figure 16:
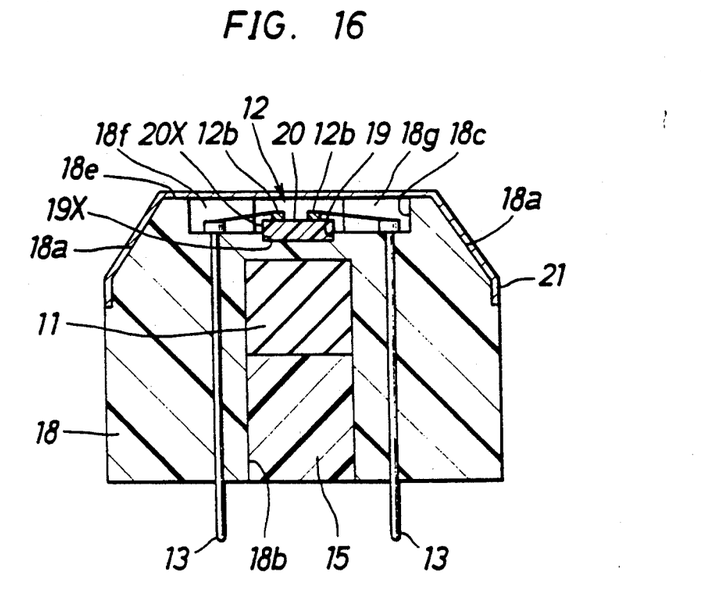
FIG. 16 is a sectional view equivalent to FIG. 7.
Figure 17:
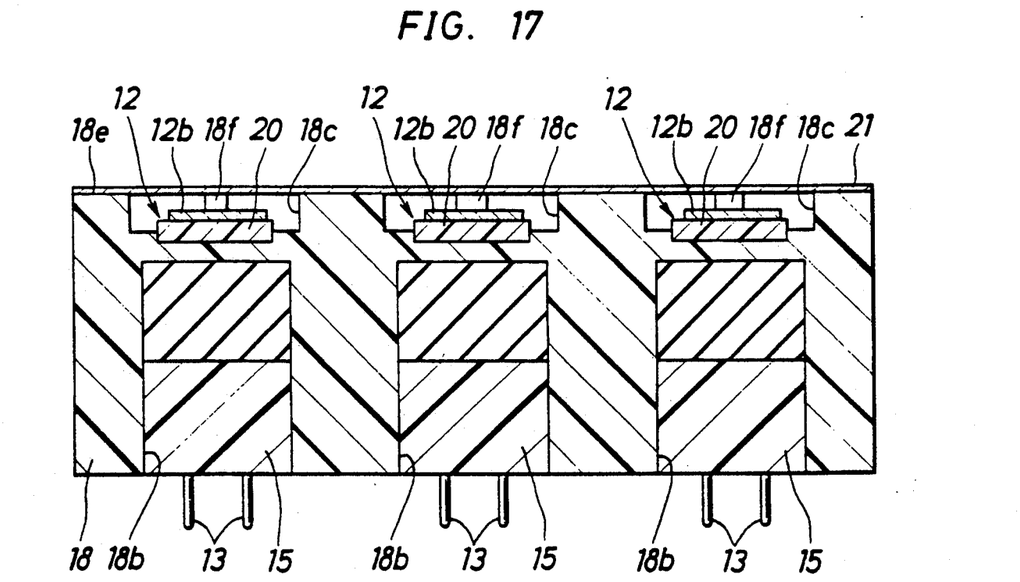
FIG. 17 is a longitudinal sectional view equivalent to FIG. 8.
Figure 18:
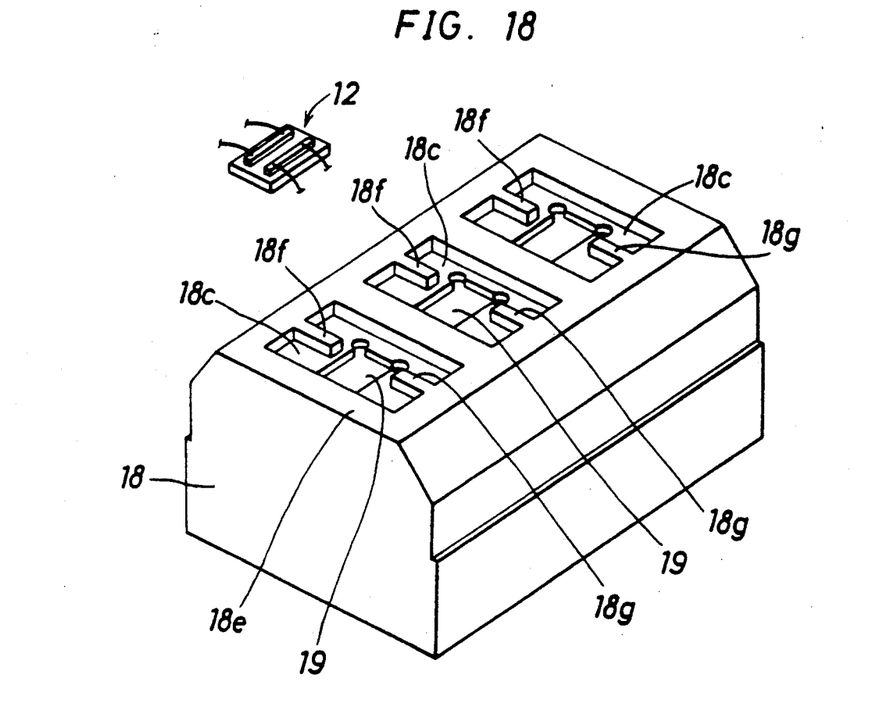
FIG. 18 is a perspective view showing the magnetic sensor unit from which a head cover is detached.
Figure 19:
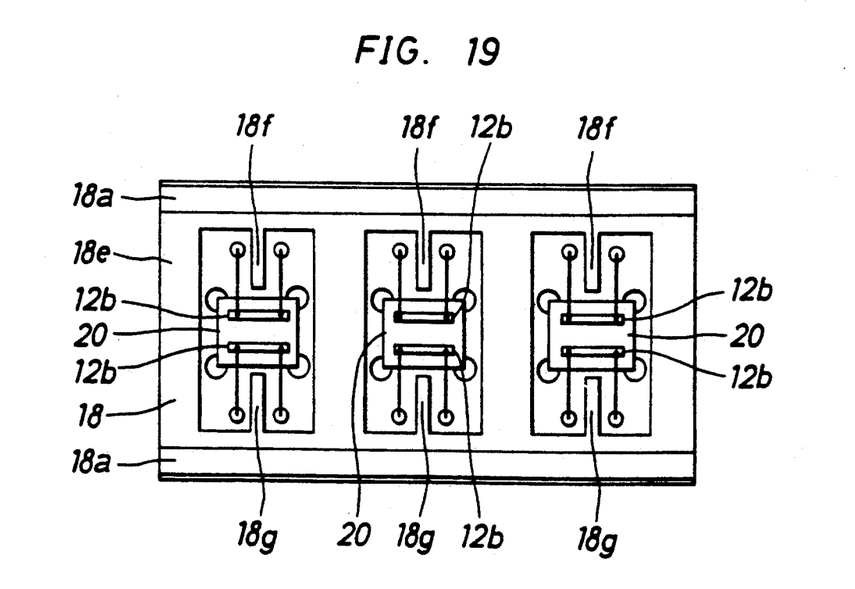
FIG. 19 is a plan view of the magnetic sensor unit on which magnetic heads are mounted, which is equivalent to FIG. 10.

In addition, since the inner end faces of the cover support pieces 18f and 18b are not in contact with the magnetoresistive elements 12b, vibrations of the head cover 21 are not transmitted to the magnetoresistive elements 12b through the head cover 21 and the cover support pieces 18f and 18g. Therefore, a proper operation of each magnetoresistive element 12b can be expected.

In all the above embodiments, three magnetic sensors are arranged in a sensor case in its longitudinal direction. However, the number of magnetic sensors may be arbitrarily selected in accordance with an application. For example, in a magnetic sensor unit developed for discrimination of banknotes, 32 magnetic sensors are arranged.

Several embodiments of the present invention have been described above. According to the present invention, a plurality of sensor housing recesses are directly formed in a sensor case, and a positioning portion is formed in each sensor housing recess so as to position a corresponding magnetic sensor on a detection line. Therefore, all the magnetic sensors can be easily and accurately arranged on the detection line, and detection can be performed with high precision.

What we claim is:

1. A magnetic sensor unit comprising:
    a nonmagnetic sensor case having a plurality of sensor housing recesses formed in a surface, and a plurality of magnet housing recesses formed in an opposing surface of said sensor case at positions respectively corresponding to the sensor housing recesses, said sensor case having a bias adjusting portion disposed between each of said sensor housing recesses and each of said magnet housing recesses;
    a nonmagnetic cover for covering at least the upper surface of said sensor case having said housing recesses;
    magnets respectively housed in the magnet housing recesses of said sensor case;
    magnetic sensors respectively housed in the sensor housing recesses of said sensor case, having magnetoelectric transducers magnetically biased by said magnets and first and second positioning edges arranged at a fixed angle relative to each other; and
    positioning means formed in each of the sensor housing recesses and defined by first and second surfaces arranged at said fixed angle with respect to each other and in direct contact with the positioning edges of each of the sensors for positioning each of said magnetic sensors along a detection line and along a direction transverse to said detection line whereby magnetic characters are substantially simultaneously detected by said magnetic sensors for the output of detection signals by said magnetic sensors.

2. The magnetic sensor unit according to claim 1, wherein said positioning means comprises positioning recesses respectively formed in bottom surfaces of the sensor housing recesses.

3. The magnetic sensor unit according to claim 1, wherein said positioning means comprise projections respectively formed on bottom surfaces of the sensor housing recesses.

4. The magnetic sensor unit according to claim 1, wherein said positioning means comprise holes respectively formed in bottom surfaces of the sensor housing recesses.

5. The magnetic sensor unit according to claim 1, further comprising cover support means formed on a bottom surface of each of the sensor housing recesses which extends to substantially the same level as the upper surface of said sensor case so that said cover is not in contact with said magnetic sensors housed in the sensor housing recess.

6. The magnetic sensor unit according to claim 1, wherein the thickness of said bias adjusting portion between each of said sensor housing recesses and magnet housing recesses of said sensor case is controlled for adjustment of magnetic biases.

7. The magnetic sensor unit according to claim 1, wherein side portions of the upper surface of said sensor case constitutes inclined surfaces, and said cover covers the upper surface and inclined surfaces of said sensor case.

8. The magnetic sensor unit of claim 1 wherein said magnetic sensor comprises a substrate having thickness larger than the depth of said positioning recess, a first reference end face and a second reference end face substantially aligned to a corresponding reference surface of said positioning means.

9. A magnetic sensor unit comprising:
 a nonmagnetic sensor case having a plurality of sensor housing recesses formed in a surface, and a plurality of magnet housing recesses formed in an opposing surface of said sensor case at positions respectively corresponding to the sensor housing recesses, said sensor case having a bias adjusting portion disposed between each of said sensor housing recesses and each of said magnet housing recesses;
 a nonmagnetic cover for covering at least the upper surface of said sensor case having said housing recesses;
 magnets respectively housed in the magnet housing recesses of said sensor case;
 magnetic sensors respectively housed in the sensor housing recesses of said sensor case, having magnetoelectric transducers magnetically biased by said magnets and first and second substantially perpendicular positioning edges; and
 positioning means having recesses respectively formed in the bottom surface of the sensor housing recesses, the positioning means including first and second, substantially perpendicular surfaces in direct contact with the perpendicular positioning edges of each of the sensor for positioning each of said magnetic sensors along a detection line and along a direction transverse to said detection line whereby magnetic characters are substantially simultaneously detected by said magnetic sensors for the output of detection signals by said magnetic sensors.

* * * * *